United States Patent
Suzuki

(10) Patent No.: US 9,218,781 B2
(45) Date of Patent: Dec. 22, 2015

(54) INFORMATION PROCESSING APPARATUS, DISPLAY CONTROL METHOD, AND PROGRAM

(71) Applicant: Sony Corporation, Tokyo (JP)

(72) Inventor: Seiji Suzuki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 148 days.

(21) Appl. No.: 13/667,393

(22) Filed: Nov. 2, 2012

(65) Prior Publication Data

US 2013/0113829 A1 May 9, 2013

(30) Foreign Application Priority Data

Nov. 9, 2011 (JP) ................................. 2011-245303

(51) Int. Cl.
*G09G 5/00* (2006.01)
*G06Q 30/06* (2012.01)
*G06T 13/40* (2011.01)

(52) U.S. Cl.
CPC .............. *G09G 5/00* (2013.01); *G06Q 30/0643* (2013.01); *G06T 13/40* (2013.01); *G09G 2340/12* (2013.01)

(58) Field of Classification Search
CPC ....................................................... G09G 5/00
See application file for complete search history.

(56) References Cited

U.S. PATENT DOCUMENTS 8,275,590 B2* 9/2012 Szymczyk et al. ................ 703/6
2011/0199393 A1* 8/2011 Nurse et al. .................... 345/665
2012/0192235 A1* 7/2012 Tapley et al. .................... 725/60

FOREIGN PATENT DOCUMENTS

JP 2006-304331 11/2006

OTHER PUBLICATIONS

Interactive Mirror, published on Youtube.com at URL: https://www.youtube.com/watch?v=7G4G55E7fcM; Publication Date Oct. 30, 2010.*
Fitnect—Interactive Virtual Fitting / Dressing Room application (https://www.youtube.com/watch?v=1jbvnk1T4vQ) Aug. 9, 2011.*

* cited by examiner

*Primary Examiner* — Kee M Tung
*Assistant Examiner* — Frank Chen
(74) *Attorney, Agent, or Firm* — Frommer Lawrence & Haug LLP; William S. Frommer; Ellen Marcie Emas

(57) ABSTRACT

There is provided an information processing apparatus including an operation detecting unit detecting an operation of a subject that has been captured, and a display control unit controlling at least one of wearing or removal of at least one of virtual clothing or accessories to be displayed overlaid on the subject in accordance with the operation detected by the operation detecting unit.

13 Claims, 12 Drawing Sheets

FIG. 1
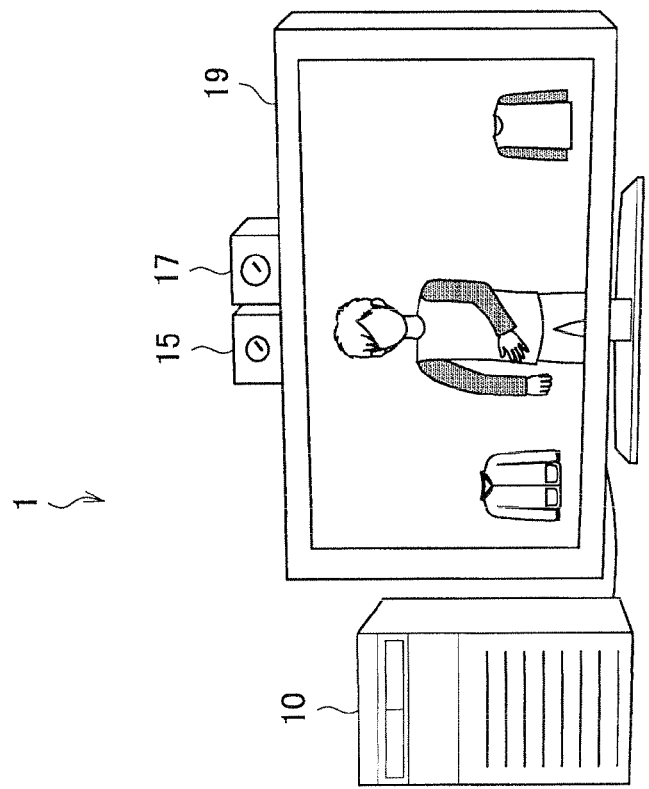
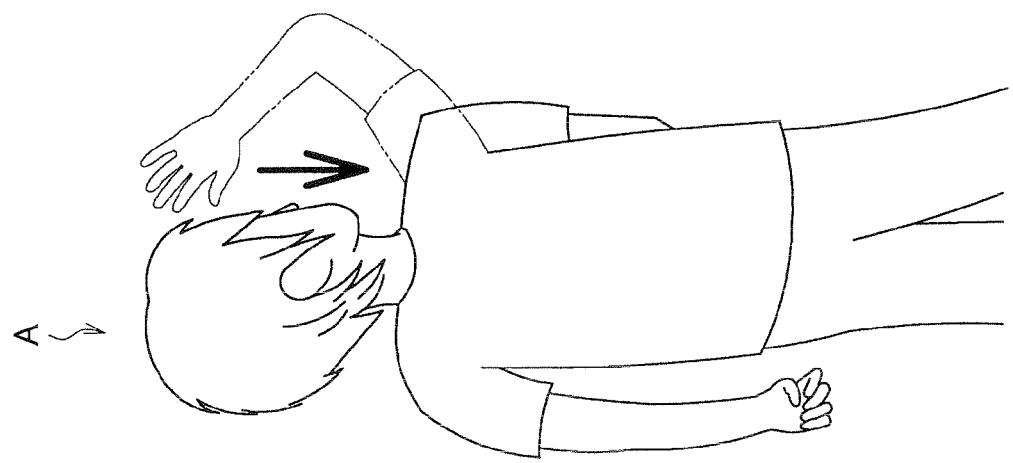

FIG. 9
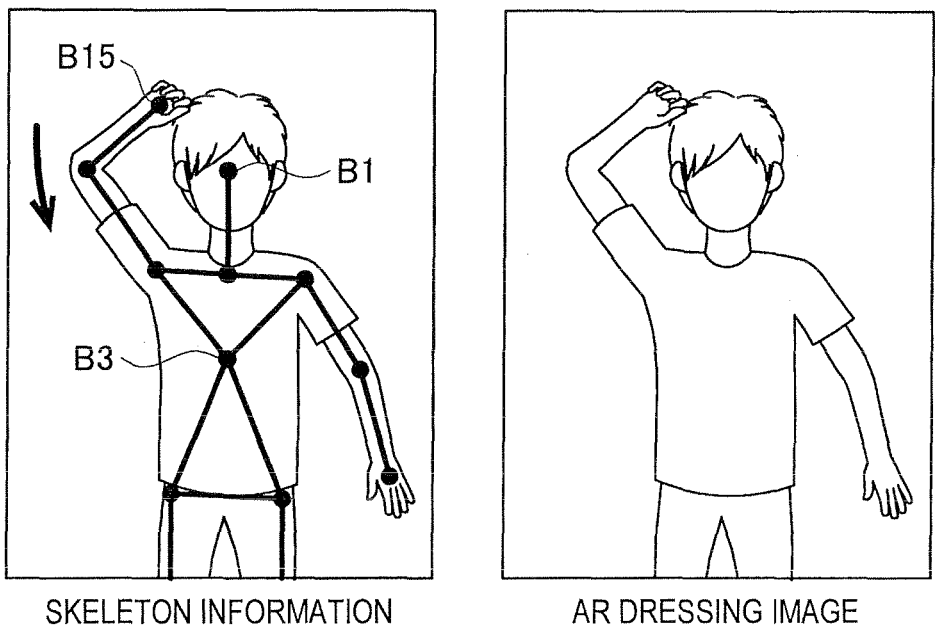
SKELETON INFORMATION        AR DRESSING IMAGE
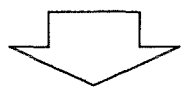
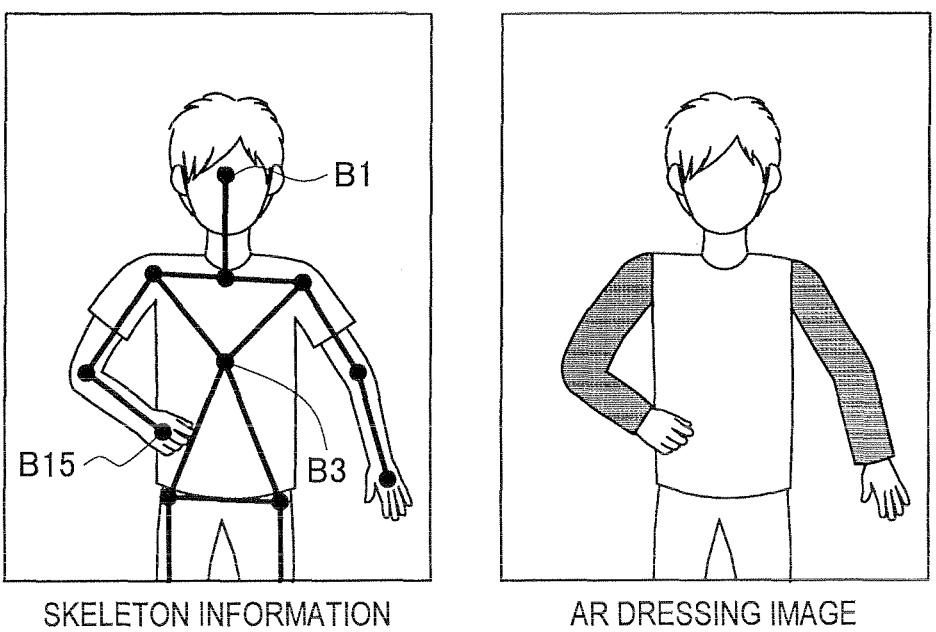
SKELETON INFORMATION        AR DRESSING IMAGE

FIG. 10
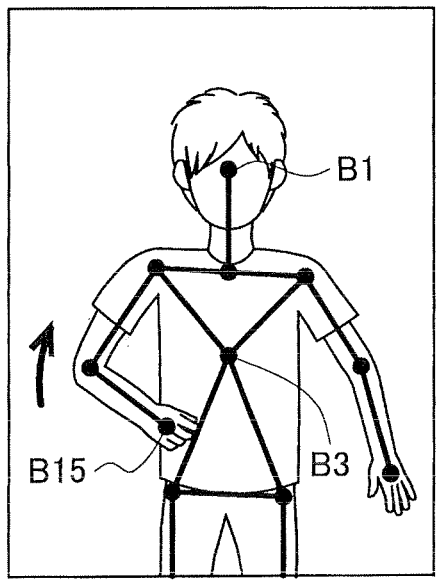
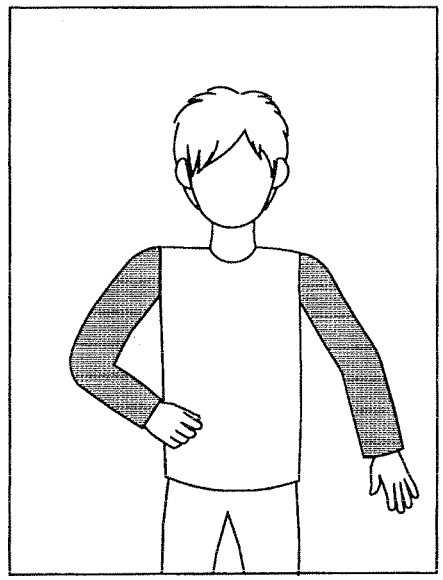
SKELETON INFORMATION  AR DRESSING IMAGE
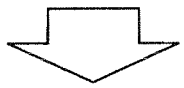
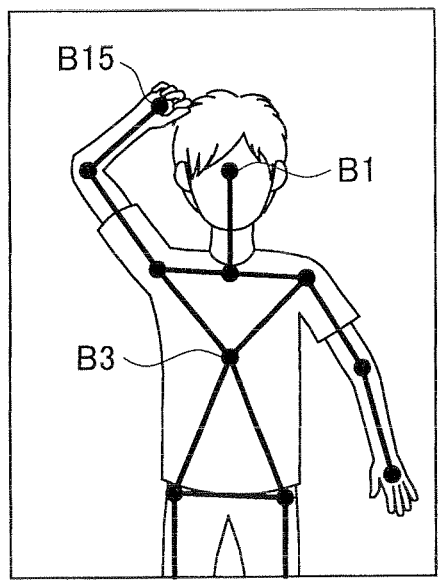
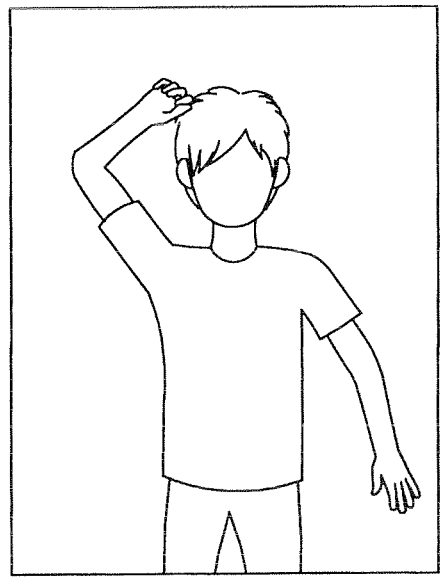
SKELETON INFORMATION  AR DRESSING IMAGE

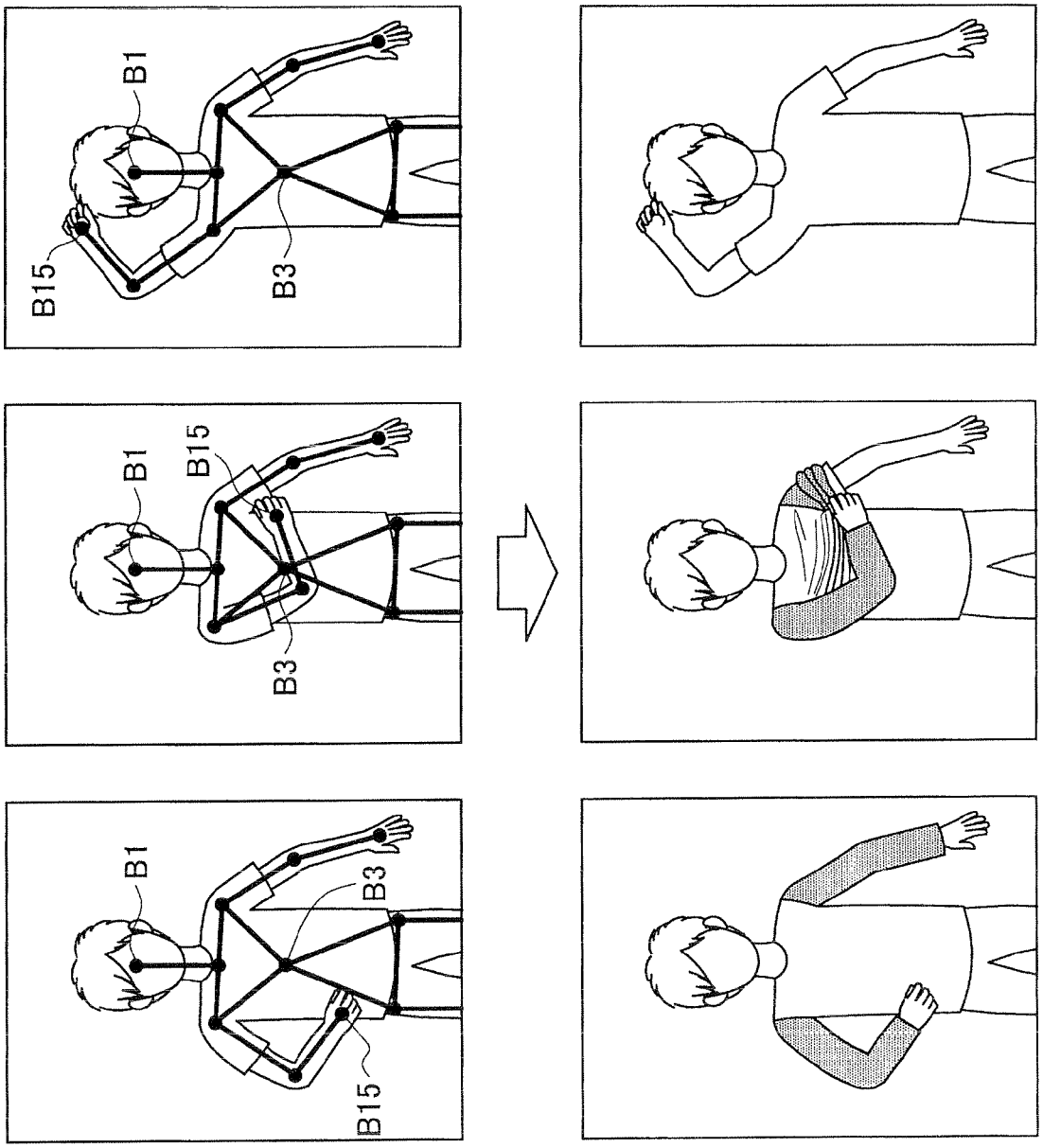

INFORMATION PROCESSING APPARATUS, DISPLAY CONTROL METHOD, AND PROGRAM

BACKGROUND

The present disclosure relates to an information processing apparatus, a display control method, and a program.

Various technologies for generating dressing images (i.e., images in which clothes or the like are tried on) by superimposing images of clothing onto images produced by capturing a user have been proposed as virtual dressing systems.

As one example, Japanese Laid-Open Patent Publication No. 2006-304331 discloses a process that superimposes images of clothing onto an image of the user's body. More specifically, the image processing server disclosed in Publication No. 2006-304331 changes the size of a clothing image and adjusts the orientation of the image based on information such as body profile data (height, shoulder width, and the like) appended to a body image of the user and the orientation of the body in the image, and then superimposes the clothing image on the body image.

SUMMARY

With the dressing image generating technology disclosed in Publication No. 2006-304331, the clothing image to be superimposed is arbitrarily selected by the user and the superimposing process is carried out automatically. As specific examples, once a selection is made by reading an ID attached to clothing using a mobile terminal or clicking a clothing image displayed on a display, a dressing image is automatically generated.

However, trying on clothes in reality involves the act of the user getting changed, and therefore the generation of dressing images by a virtual dressing system which includes no such action has lacked realism. Also, Publication No. 2006-304331 mentioned above does not consider the generation of dressing images in accordance with an action by the user.

For this reason, the present disclosure aims to provide a novel and improved information processing apparatus, display control method, and program capable of controlling wearing and/or removal of clothing and/or accessories in accordance with an operation by a subject.

According to the present disclosure, there is provided an information processing apparatus including an operation detecting unit detecting an operation of a subject that has been captured, and a display control unit controlling wearing and/or removal of virtual clothing and/or accessories to be displayed overlaid on the subject in accordance with the operation detected by the operation detecting unit.

According to the present disclosure, there is provided a display control method including detecting an operation of a subject that has been captured; and controlling wearing and/or removal of virtual clothing and/or accessories to be displayed overlaid on the subject in accordance with the detected operation.

According to the present disclosure, there is provided a program causing a computer to execute, a process detecting an operation of a subject that has been captured, and a process controlling wearing and/or removal of virtual clothing and/or accessories to be displayed overlaid on the subject in accordance with the detected operation.

According to the embodiments of the present disclosure described above, it is possible to control wearing and/or removal of clothing and/or accessories in accordance with an operation by a subject.

BRIEF DESCRIPTION OF THE DRAWINGS

FIG. 1 is a diagram useful in explaining an overview of an AR dressing system according to an embodiment of the present disclosure;

FIG. 9 is a diagram useful in explaining an example of wearing control in accordance with a valid gesture according to the embodiment of the present disclosure;

FIG. 10 is a diagram useful in explaining an example of removal control in accordance with a valid gesture according to the embodiment of the present disclosure;

FIG. 12 is a diagram useful in explaining the displaying of intermediate progress of a removal operation according to the embodiment of the present disclosure.

DETAILED DESCRIPTION OF THE EMBODIMENT(S)

Figure 2:
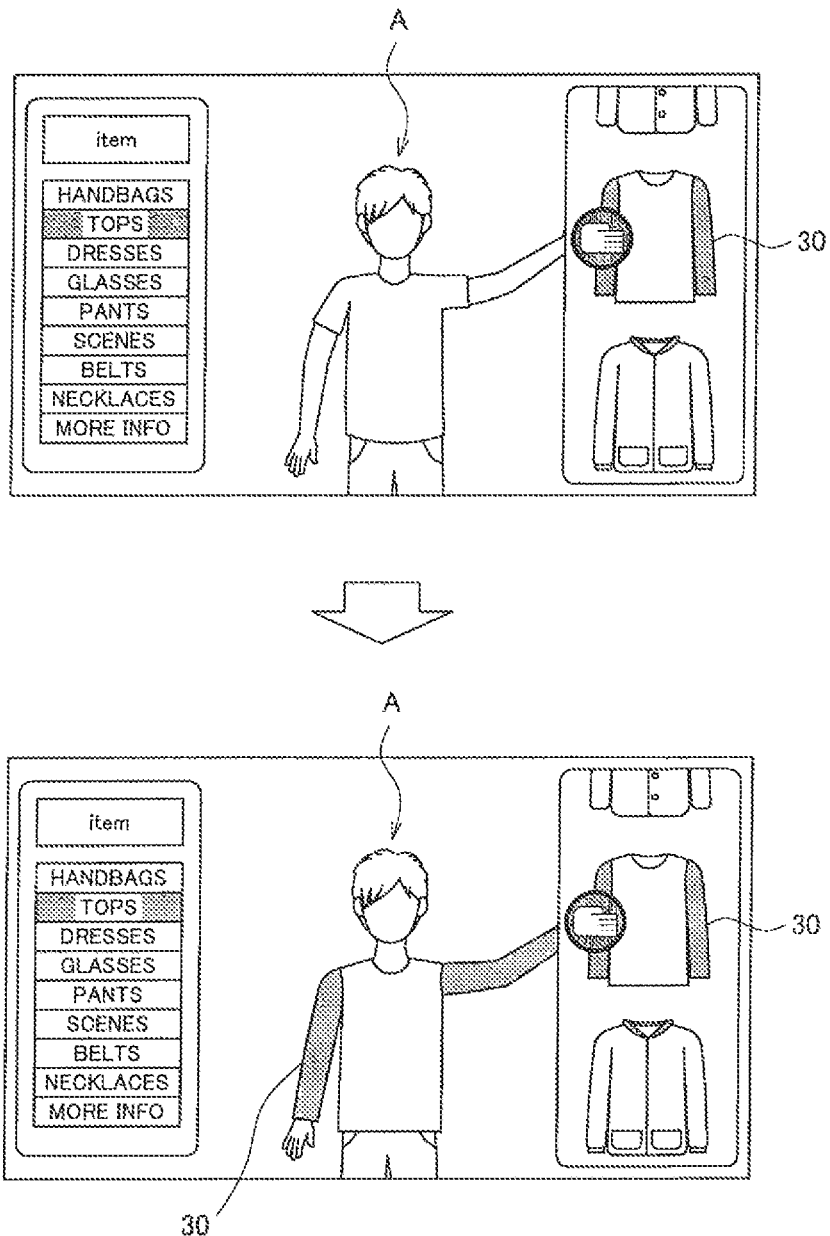
FIG. 2 is a diagram useful in explaining wearing (superimposing process) timing in a normal virtual dressing system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview of AR Dressing System According to an Embodiment of the Present Disclosure
2. Configuration of Information Processing Apparatus
3. Display Control
   3-1. Fundamental Display Control
   3-2. Wearing and/or Removal Control in Accordance With Gesture
4. Conclusion

1. OVERVIEW OF AR DRESSING SYSTEM ACCORDING TO AN EMBODIMENT OF THE PRESENT DISCLOSURE

In recent years, attention has been focused on a technology called augmented reality (AR) that presents additional information to the user by overlaying such information onto the real world. The information presented to the user by AR technology is visualized using virtual objects of a variety of forms, such as text, icons, and animations. One of the main uses of AR technology is to support user activities in the real world. In the following description, AR technology is applied to a dressing system (i.e., a system for trying on clothes and the like).

By displaying an image of virtual clothing overlaid on the body in keeping with a user operation, a dressing system that uses AR technology enables a user to virtually try on clothes in real time. Also, an AR dressing system according to an embodiment of the present disclosure controls the wearing and/or removal of virtual clothing in accordance with user operations and enables the user to intuitively put on and take off virtual clothing. Note that in the present specification, the expression "wearing and/or removal" includes wearing or putting on the body, taking off or removing from the body, and changing (taking off and putting on).

An overview of the AR dressing system according to the present embodiment of the disclosure will now be described with reference to FIG. 1. As shown in FIG. 1, an AR dressing system 1 according to the present embodiment of the disclosure includes an information processing apparatus 10, a camera 15, a sensor 17, and a display apparatus 19. Note that there are no particular limitations on the location where the AR dressing system 1 is set up. As examples, the AR dressing system 1 may be set up in the user's home or may be set up in a store.

Also, although the plurality of apparatuses that compose the AR dressing system 1 (that is, the information processing apparatus 10, the camera 15, the sensor 17, and the display apparatus 19) are configured as separate devices in the example shown in FIG. 1, the configuration of the AR dressing system 1 according to the present embodiment is not limited to this. For example, any combination of a plurality of apparatuses that compose the AR dressing system 1 may be integrated into a single apparatus. As another example, the plurality of apparatuses that compose the AR dressing system 1 may be incorporated into a smartphone, a PDA (personal digital assistant), a mobile phone, a mobile audio reproduction device, a mobile image processing device, or a mobile game console.

The camera (image pickup apparatus) 15 picks up images of an object present in a real space. Although there are no particular limitations on the object present in the real space, as examples such object may be an animate object such as a person or an animal or an inanimate object such as a garage or a television stand. In the example shown in FIG. 1, as the object present in a real space, the subject A (for example, a person) is captured by the camera 15. Images picked up by the camera 15 (hereinafter also referred to as "picked-up images") are displayed on the display apparatus 19. The picked-up images displayed on the display apparatus 19 may be RGB images. Also, the camera 15 sends the picked-up images to the information processing apparatus 10.

The sensor 17 has a function for detecting parameters from the real space and sends detected data to the information processing apparatus 10. For example, if the sensor 17 is constructed of an infrared sensor, the sensor 17 is capable of detecting infrared waves from the real space and supplying an electrical signal in keeping with the detected amount of infrared as the detected data to the information processing apparatus 10. As one example, the information processing apparatus 10 is capable of recognizing the object present in the real space based on the detected data. The type of the sensor 17 is not limited to an infrared sensor. Note that although the detected data is supplied from the sensor 17 to the information processing apparatus 10 in the example shown in FIG. 1, the detected data supplied to the information processing apparatus 10 may be images picked up by the camera 15.

The information processing apparatus 10 is capable of processing the picked-up images, such as by superimposing a virtual object on the picked-up images and and/or or reshaping the picked-up images, in keeping with a recognition result for the object present in the real space. The display apparatus 19 is also capable of displaying the images processed by the information processing apparatus 10.

For example, as shown in FIG. 1, the information processing apparatus 10 is capable of recognizing the subject A in the real space and displaying dressing images in which a clothing image is superimposed on the display apparatus 19 in real time. In this example, the user's body is video of the real space and images of clothing to be tried on are a virtual object displayed by being overlaid on the video of the real space. By doing so, the AR dressing system 1 provides a virtual dressing room in real time.

Here, with a normal virtual dressing system, a dressing image is automatically generated when the subject has selected virtual clothing. Normal wearing control of virtual clothing will now be described with reference to FIG. 2.

FIG. 2 is a diagram useful in explaining wearing control of virtual clothing by a normal virtual dressing system. As shown at the top in FIG. 2, with a normal virtual dressing system, when it is detected that the subject A has moved his/her hand to a position where virtual clothing 30 is displayed, the virtual clothing 30 is selected as the virtual clothing to be tried on. At substantially the same time as when the virtual clothing 30 is selected, as shown at the bottom in FIG. 2, a dressing image where the virtual clothing 30 is superimposed on the subject A is automatically generated and displayed. In this way, with a normal virtual dressing system, generation of a dressing image where the virtual clothing 30 is superimposed is automatically carried out at substantially the same time as when the virtual clothing 30 is selected.

However, when the user tries on clothes in reality, there is a two-stage process of selecting clothes and then getting changed, which means that it is unrealistic to carry out a superimposing process for virtual clothing at substantially the same time as when the virtual clothing is selected as described above.

For this reason, with an AR dressing system according to an embodiment of the present disclosure, an operation by the subject A is detected and wearing and/or removal is controlled in accordance with the detected operation so as to superimpose a clothing image on a picked-up image (i.e., to wear clothing) or to separate a clothing image from a dressing image (i.e., to remove clothing). As one example, as shown in FIG. 1, the subject A is capable of trying on virtual clothing by carrying out an operation to lower his hand from his head to his torso. In this way, according to the present embodiment, since wearing and/or removal is controlled in accordance with an operation by the subject A, it is possible for the user to intuitively wear and/or remove virtual clothing.

2. CONFIGURATION OF INFORMATION PROCESSING APPARATUS

Figure 3:
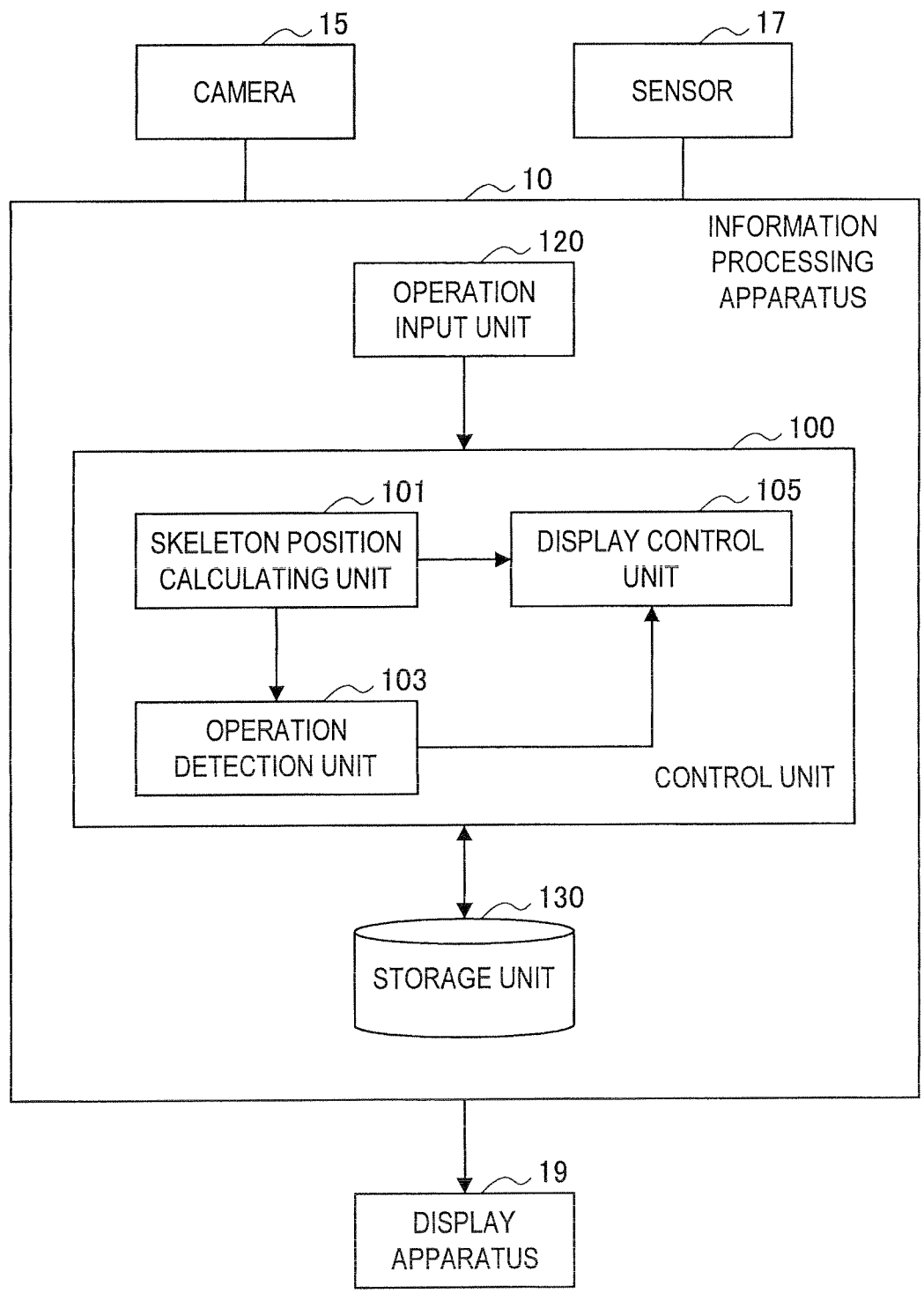
FIG. 3 is a block diagram showing the configuration of an information processing apparatus according to the embodiment of the present disclosure.

Next, the configuration of the information processing apparatus 10 that realizes the AR dressing system according to the present embodiment of the disclosure will be described with reference to FIG. 3. As shown in FIG. 3, the information processing apparatus 10 includes a control unit 100, an operation input unit 120, and a storage unit 130. The control unit 100 includes a skeleton position calculating unit 101, an operation detection unit 103, and a display control unit 105.

The information processing apparatus 10 is also connected wirelessly or via wires to the camera 15, the sensor 17, and the display apparatus 19.

The control unit 100 corresponds to a processor such as a CPU (Central Processing Unit) or a DSP (Digital Signal Processor). By executing a program stored in the storage unit 130 or another storage medium, the control unit 100 realizes the variety of functions of the control unit 100, described later. Note that the respective blocks that compose the control unit 100 may all be incorporated in the same apparatus or some of such blocks may be incorporated in another apparatus (such as a server).

The storage unit 130 stores a program and data for processing by the information processing apparatus 10 using a storage medium such as a semiconductor memory or a hard disk. As one example, the storage unit 130 stores a program for causing a computer to function as the control unit 100. The storage unit 130 may also store data to be used by the control unit 100, for example. The storage unit 130 according to the present embodiment stores three-dimensional data for clothing and/or accessories as virtual objects to be displayed. Note that in the present specification, the expression "clothing and/or accessories" can include clothes and accessories. Here, the expression "accessories" includes eyeglasses, hats, belts, and the like.

The operation input unit 120 includes an input device, such as a mouse, a keyboard, a touch panel, a button or buttons, a microphone, a switch or switches, a lever or levers, or a remote controller, that enables the user to input information, an input control circuit that generates an input signal based on an input made by the user and outputs to the control unit 100, and the like. By operating the operation input unit 120, it is possible for the user to turn the power of the information processing apparatus 10 on and off and to give instructions such as launching an AR dressing system program.

The camera 15 (image pickup apparatus) generates picked-up images by capturing a real space using an image pickup element such as a CCD (Charge Coupled Device) or a CMOS (Complementary Metal Oxide Semiconductor). Although the camera 15 is assumed to be constructed separately to the information processing apparatus 10 in the present embodiment of the disclosure, the camera 15 may be part of the information processing apparatus 10.

Figure 4:
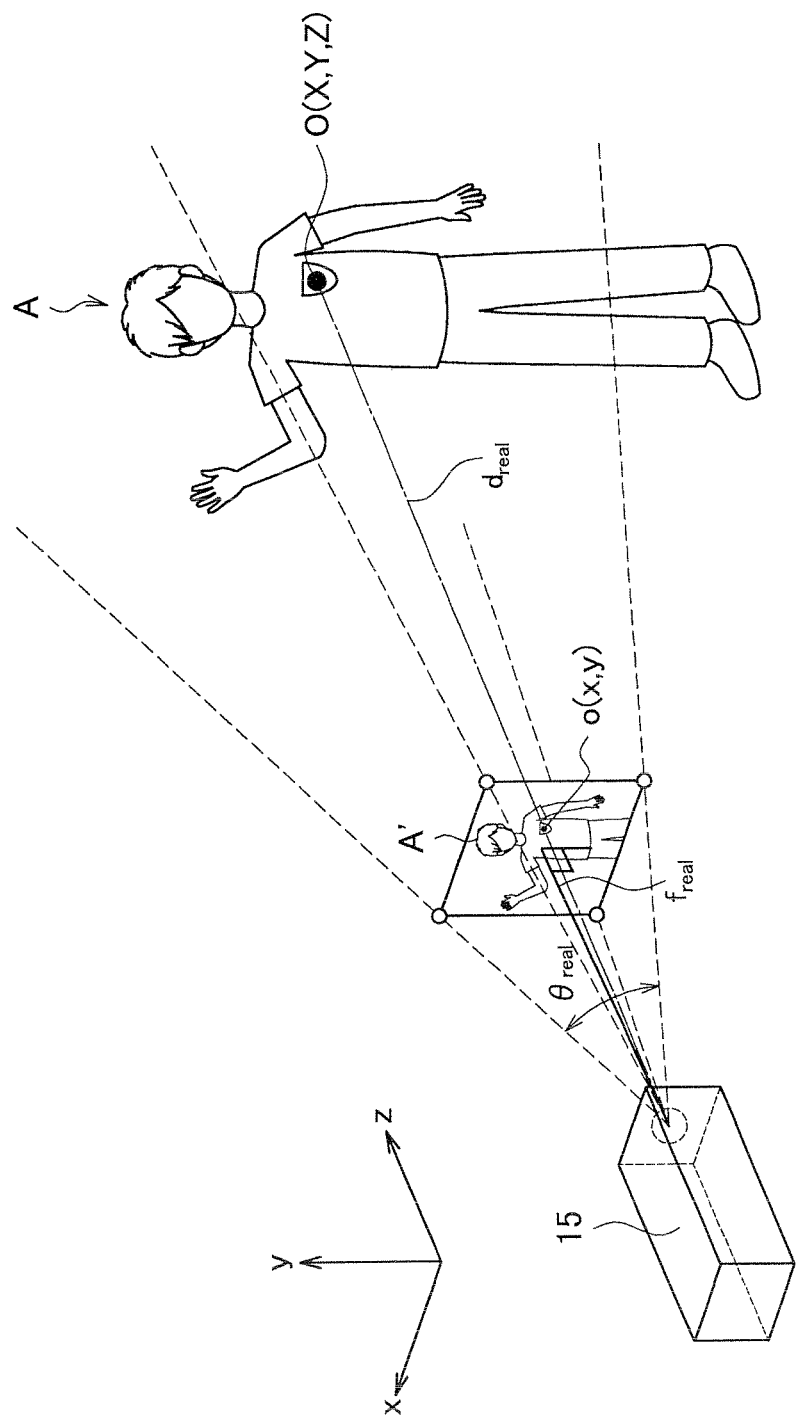
FIG. 4 is a diagram useful in explaining the positional relationship between a camera and a subject in a real space and a picked-up image in which the subject is captured.

The camera 15 also supplies settings information of the camera 15 used during image pickup to the control unit 100. FIG. 4 is a diagram useful in explaining the positional relationship between the camera 15 and the subject A in the real space and a picked-up image A' produced by capturing the subject A. For ease of illustration, in FIG. 4 the focal distance $f_{real}$ from the principal point that is the optical center of the lens (not shown) of the camera 15 to the image pickup element (also not shown) of the camera 15 and the picked-up image A' (which is two-dimensional with xy coordinates) of the subject A (which is three-dimensional with xyz coordinates) produced on the image pickup element are shown on the same side as the subject. As described later, the distance $d_{real}$ from the camera 15 to the subject A is calculated as depth information. The angle of view $\theta_{real}$ of the camera 15 is mainly decided according to the focal distance $f_{real}$. As an example of the settings information of the camera 15, the camera 15 supplies the focal distance $f_{real}$ (or the angle of view $\theta_{real}$) and the resolution (that is, the number of pixels) of the picked-up image A' to the information processing apparatus 10.

The sensor 17 has a function for detecting parameters from the real space. As one example, if the sensor 17 is constructed of an infrared sensor, the sensor 17 is capable of detecting infrared from the real space and supplying an electrical signal in keeping with the detected amount of infrared as detected data to the information processing apparatus 10. The type of sensor 17 is not limited to an infrared sensor. Note that if an image picked up by the camera 15 is supplied to the information processing apparatus 10 as the detected data, the sensor 17 does not need to be provided.

The display apparatus 19 is a display module constructed of an LCD (Liquid Crystal Display), an OLED (Organic Light-Emitting Diode), a CRT (Cathode Ray Tube) or the like. Although a configuration where the display apparatus 19 is constructed separately to the information processing apparatus 10 is imagined in the present embodiment of the disclosure, the display apparatus 19 may be part of the information processing apparatus 10.

Next, the functional configuration of the control unit 100 mentioned above will be described. As described earlier, the control unit 100 includes the skeleton position calculating unit 101, the operation detection unit 103, and the display control unit 105.

Skeleton Position Calculating Unit 101

The skeleton position calculating unit 101 calculates the skeleton position of the body appearing in a picked-up image based on the detected data. There are no particular limitations on the method of calculating the skeleton position in the real space of the object appearing in a picked-up image. As one example, the skeleton position calculating unit 101 first recognizes a region in which an object is present in the picked-up image (also referred to as the "object-present region") and acquires depth information of the object in the picked-up image. The skeleton position calculating unit 101 may then recognize the parts (head, left shoulder, right shoulder, torso, and the like) in the real space of the object appearing in the picked-up image based on the depth and form (feature amounts) of the object-present region and calculate center positions of the respective parts as the skeleton position. Here, the skeleton position calculating unit 101 is capable of using a feature amount dictionary stored in the storage unit 130 to compare feature amounts decided from a picked-up image with feature amounts for each part of an object registered in advance in the feature amount dictionary and thereby recognize the parts of the object included in the picked-up image.

Various methods can be conceivably used to recognize the object-present region. For example, if a picked-up image is supplied to the information processing apparatus 10 as detected data, the skeleton position calculating unit 101 can recognize the object-present region based on differences between a picked-up image before the object appears and a picked-up image in which the object appears. In more detail, the skeleton position calculating unit 101 is capable of recognizing a region in which the difference between a picked-up image before the object appears and a picked-up image in which the object appears exceeds a threshold as the object-present region.

As another example, if parameters detected by the sensor 17 have been supplied to the information processing apparatus 10 as the detected data, the skeleton position calculating unit 101 is capable of recognizing the object-present region based on the detected data. In more detail, the skeleton position calculating unit 101 is capable of recognizing a region in which the detected amount of infrared exceeds a threshold as the object-present region.

Various methods can be conceivably used to acquire the depth information of an object in a picked-up image. For example, it is possible to decide the distance between the camera 15 and the object in advance. That is, it is possible to set a limitation that the object is disposed at a position a distance decided in advance away from the camera 15. If such a limitation is provided, it is possible for the skeleton position calculating unit 101 to treat the depth information of the object (here, the distance between the camera 15 and the object) as a fixed value (for example, 2 m).

The skeleton position calculating unit 101 is also capable of calculating the depth information of the object in a picked-up image based on parameters calculated by the sensor 17. In more detail, if the skeleton position calculating unit 101 emits light such as infrared toward the object from an emitter device (not shown), it will be possible to calculate depth information for the object in the picked-up image by analyzing the light detected by the sensor 17.

As another example, the skeleton position calculating unit 101 is capable of calculating the depth information of the object in a picked-up image based on a phase delay of light detected by the sensor 17. This method is sometimes referred to as TOF (Time Of Flight). Alternatively, if the light emitted from an emitter device (not shown), is composed of a known pattern, the skeleton position calculating unit 101 may calculate the depth information of the object in a picked-up image by analyzing the degree of distortion of the pattern constructed by the light detected by the sensor 17.

Note that an image pickup apparatus with a function for calculating depth information of an object in a picked-up image is referred to as a depth camera and can be realized by a stereo camera or a laser range scanner. The skeleton position calculating unit 101 may acquire the depth information from a depth camera that is connected to the information processing apparatus 10.

Based on the depth and form (feature amounts) of the object-present region acquired by the methods described above, the skeleton position calculating unit 101 recognizes the parts (head, shoulders, and the like) in the real space of the object appearing in a picked-up image and calculates the skeleton position of the respective parts. Skeleton information including the skeleton position of at least one part that constructs the subject A calculated by the skeleton position calculating unit 101 will now be described with reference to FIG. 5.

Figure 5:
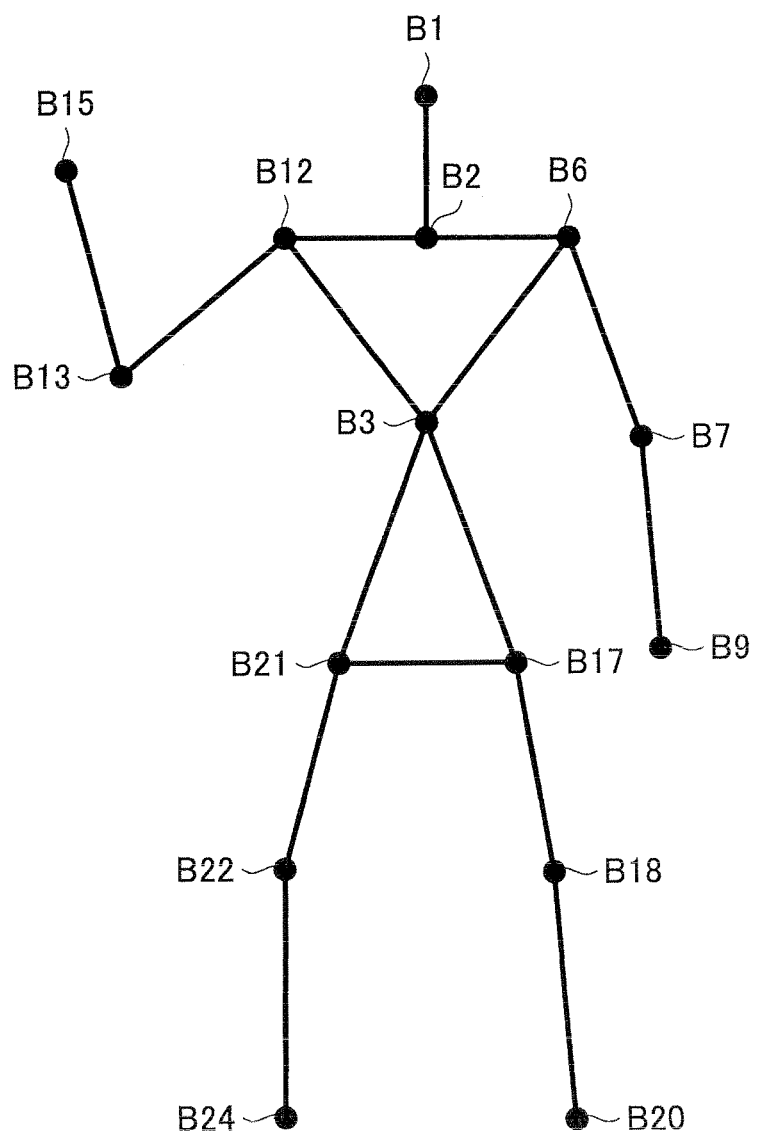
FIG. 5 is a diagram useful in explaining skeleton information according to the embodiment of the present disclosure.

FIG. 5 is a diagram useful in explaining skeleton information. Although the coordinates B1 to B3, B6, B7, B9, B12, B13, B15, B17, B18, B20 to B22, and B24 showing the positions of fifteen parts that construct the subject A are given as one example of the skeleton information in FIG. 5, there are no particular limitations on the number of parts included in the skeleton information.

Note that the coordinates B1 show coordinates of the "Head", the coordinates B2 show coordinates of the "Neck", the coordinates B3 show coordinates of the "Torso", the coordinates B6 show coordinates of the "Right Shoulder", and the coordinates B7 show coordinates of the "Right Elbow". Additionally, the coordinates B9 show coordinates of the "Right Hand", the coordinates B12 show coordinates of the "Left Shoulder", the coordinates B13 show coordinates of the "Left Elbow", and the coordinates B15 show coordinates of the "Left Hand".

The coordinates B17 show coordinates of the "Right Hip", the coordinates B18 show coordinates of the "Right Knee", the coordinates B20 show coordinates of the "Right Foot", and the coordinates B21 show coordinates of the "Left Hip". The coordinates B22 show coordinates of the "Left Knee" and the coordinates B24 show coordinates of the "Left Foot".

The skeleton position calculating unit 101 according to the present embodiment acquires depth information for an object in a picked-up image as described earlier, and as a specific example the depth information may be acquired from the depth camera described above as a picked-up image (not shown) in which shading changes in accordance with the depth.

Operation Detection Unit 103

The operation detection unit 103 detects operations based on changes over time in the skeleton position calculated by the skeleton position calculating unit 101 and if a valid gesture has been made, outputs the detected valid gesture to the display control unit 105. The operation detection unit 103 compares a detected operation with gestures registered in a gesture DB (database) stored in advance in the storage unit 130 to determine whether the detected operation is a valid gesture. As one example, an operation of moving a hand from the head toward the torso is registered in the gesture DB as a valid gesture indicating the wearing of clothing. An operation of moving a hand from the torso toward the head is also registered in the gesture DB as a valid gesture indicating the removal of clothing. An operation where the subject A rotates in substantially the horizontal direction is also registered in the gesture DB as a valid gesture indicating the changing (i.e., removal and wearing) of clothes. The operation detection unit 103 outputs the detected valid gesture to the display control unit 105.

Note that detection of an operation by the subject (for example, a person) in the real space may be realized by operation detection based on the skeleton information described earlier or by another technology generally referred to as "motion capture". For example, the operation detection unit 103 may detect an operation by the subject based on detected parameters from acceleration sensors or the like attached to joints of the subject. The operation detection unit 103 may also detect the operation by detecting movement of markers attached to the subject.

Display Control Unit 105

The display control unit 105 carries out control that generates an AR dressing image where virtual clothing is displayed overlaid on a subject appearing in the picked-up image and displays the AR dressing image on the display apparatus 19. The display control unit 105 according to the present embodiment is capable of controlling the wearing and removal of virtual clothing in accordance with an operation (a valid gesture indicating the wearing or removal of clothing) detected by the operation detection unit 103. More specifically, the display control unit 105 controls the wearing, removal, or changing (i.e., removal and wearing) of clothing in accordance with a gesture (i.e., a change in a time series of coordinates) by the subject A.

Figure 6:
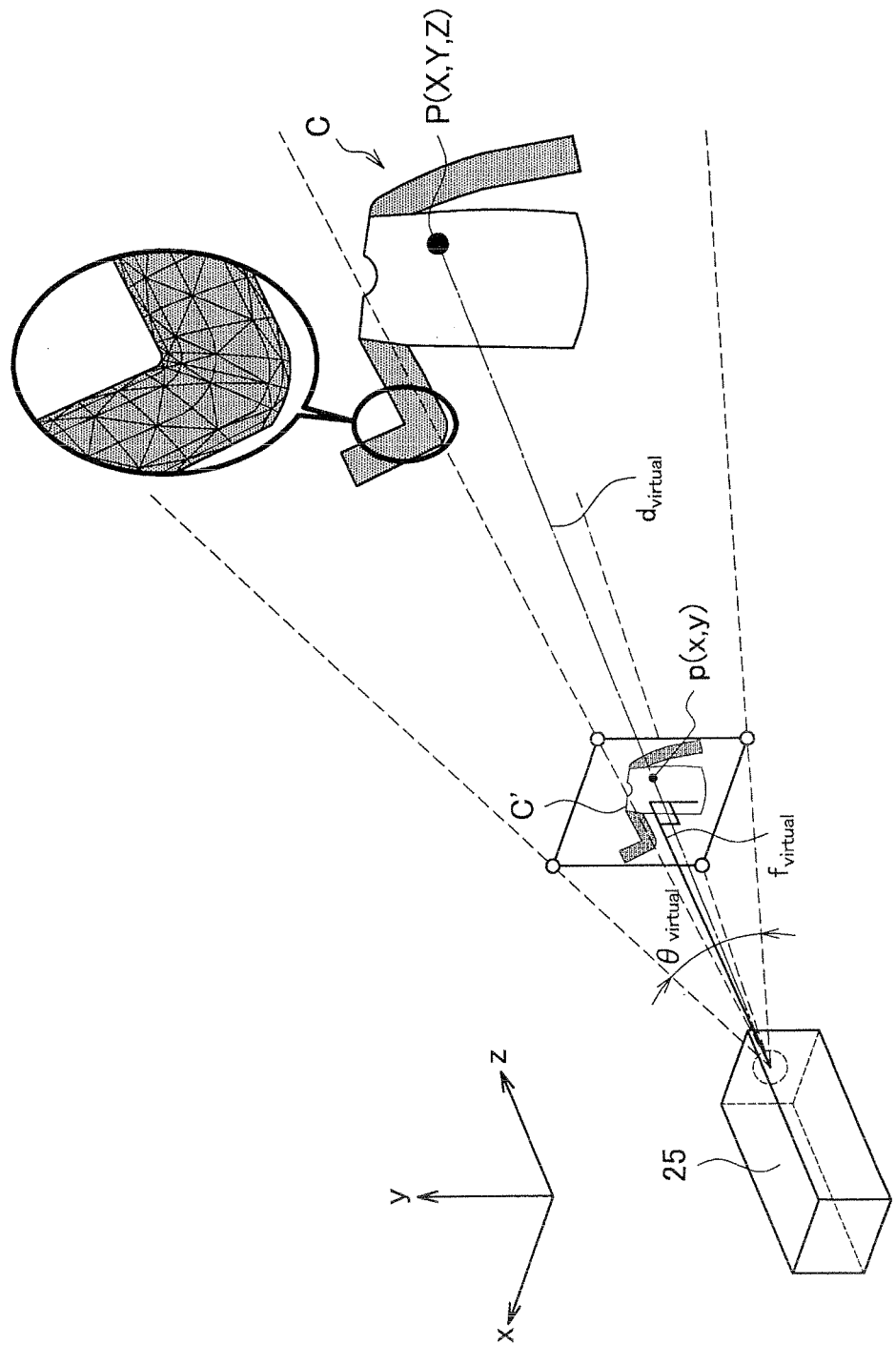
FIG. 6 is a diagram useful in explaining the positional relationship between a virtual camera and virtual clothing in a virtual space and a virtual clothing image produced by projecting the virtual clothing.

Here, generation of the virtual clothing to be overlaid on the picked-up image will be described with reference to FIG. 6. FIG. 6 is a diagram useful in explaining the positional relationship between the virtual camera 25 and the virtual clothing C in the virtual space and the virtual clothing image C' (also referred to as the "virtual image") produced by projecting (rendering) the virtual clothing C. In FIG. 6, in the same way as the picked-up image A' produced by capturing the real space shown in FIG. 4, the rendered virtual clothing image C' is shown on same side as the virtual clothing.

The settings (internal parameters) of the virtual camera 25 are decided in accordance with the settings (internal parameters) of the camera 15 that captures the real space. The expression "settings (internal parameters) of the camera" may for example be focal distance f, angle $\theta$, and number of pixels. The display control unit 105 sets the settings of the virtual camera 25 so as to match the camera 15 of the real space (this process is also referred to as "initialization").

Next, based on the depth information of the object in the picked-up image, the display control unit 105 disposes the virtual clothing C in accordance with the skeleton position of the subject at a position that is separated from the virtual camera 25 by a distance $d_{virtual}$ that is the same as the distance $d_{real}$ from the camera 15 to the subject A in the real space. The display control unit 105 may generate the virtual clothing C based on three-dimensional data that has been modeled in advance. As shown in FIG. 6, for example, the display control unit 105 is capable of representing the three-dimensional form of the virtual clothing in a more realistic manner by constructing the surfaces of the virtual clothing C from a set of triangular polygons. If the skeleton position of the subject A changes over time, the display control unit 105 is capable of changing the position of the virtual clothing C so as to track the skeleton position.

Next, the display control unit 105 acquires the clothing image C' (or "virtual image") by rendering, that is, projecting the three-dimensional virtual clothing C to produce a two-dimensional flat image using the virtual camera 25. The display control unit 105 can then generate the AR dressing image by displaying the virtual clothing image C' overlaid on the picked-up image A' (see FIG. 4). Note that display control of an AR dressing image by the display control unit 105 will be described in more detail next in the "3. Display Control" section.

This completes the detailed description of the configuration of the information processing apparatus 10 that realizes the AR dressing system according to the present embodiment of the disclosure. Next, display control for an AR dressing image by the information processing apparatus 10 will be described.

3. DISPLAY CONTROL 3-1. Fundamental Display Control

Figure 7:
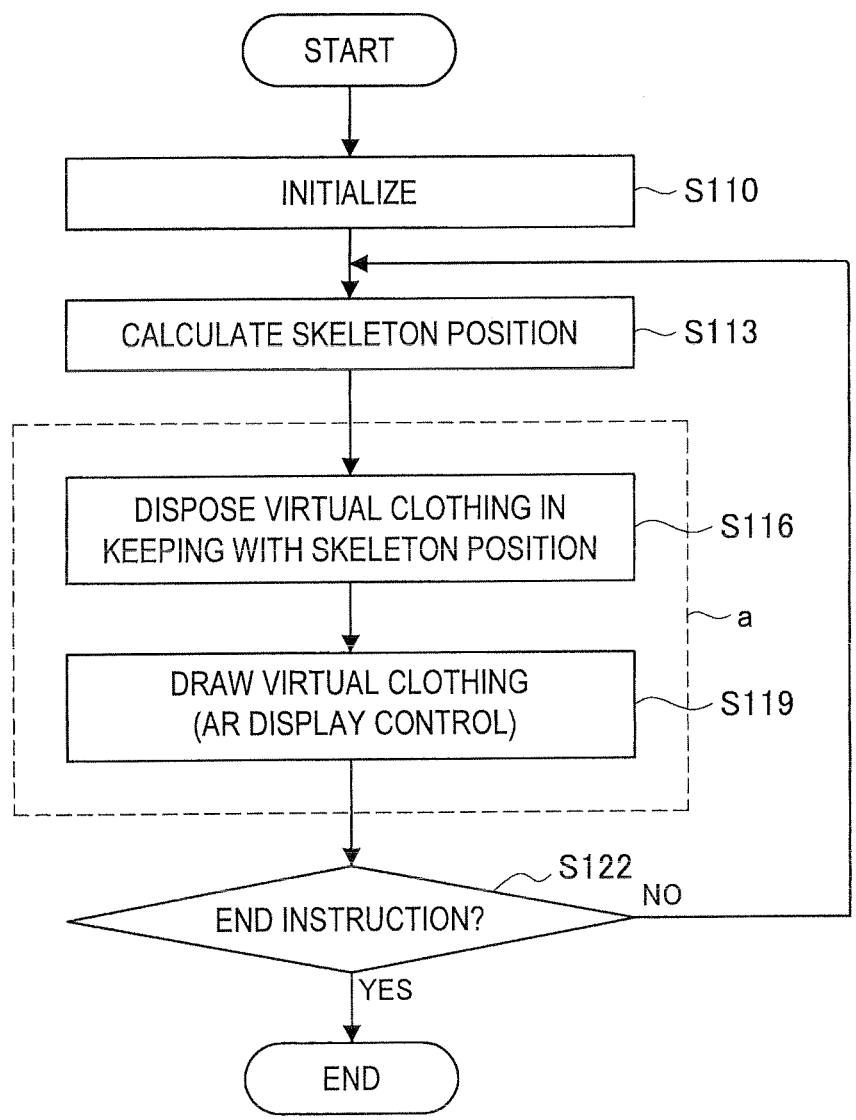
FIG. 7 is a flowchart showing a fundamental display control process for displaying an AR dressing image according to the embodiment of the present disclosure.

FIG. 7 is a flowchart showing the fundamental display control process for an AR dressing image carried out by the information processing apparatus 10. As shown in FIG. 7, first, in step S110, the display control unit 105 carries out initialization to make the settings of the virtual camera 25 in the virtual space match the settings of the camera 15 in the real space.

Next, in step S113, the skeleton position calculating unit 101 calculates the skeleton position (xyz coordinates) of the subject A in the real space that has been captured and outputs the skeleton position to the operation detection unit 103 and the display control unit 105.

After this, in step S116, the display control unit 105 disposes the virtual clothing C in a virtual space in accordance with the skeleton position (xyz coordinates) of the subject A.

Next, in step S119, the display control unit 105 carries out control (AR display control) that renders the virtual clothing C to acquire the clothing image C' (virtual image), draws the AR dressing image by superimposing the clothing image C' on the picked-up image A', and displays the picked-up image A' on the display apparatus 19.

In step S122, the information processing apparatus 10 repeatedly carries out step S113 to S119 until an end instruction is given. By doing so, the information processing apparatus 10 is capable of providing AR dressing images that track the movement of the subject A in real time.

This completes the description of the fundamental display control process. In addition, the information processing apparatus 10 according to the present embodiment is capable of changing the wearing and/or removal state of virtual clothing in accordance with an operation by the subject A. Wearing and/or removal control in accordance with a gesture according to the present embodiment will now be described in detail with reference to FIG. 8.

3-2. Wearing and/or Removal Control in Accordance with Gesture

Figure 8:
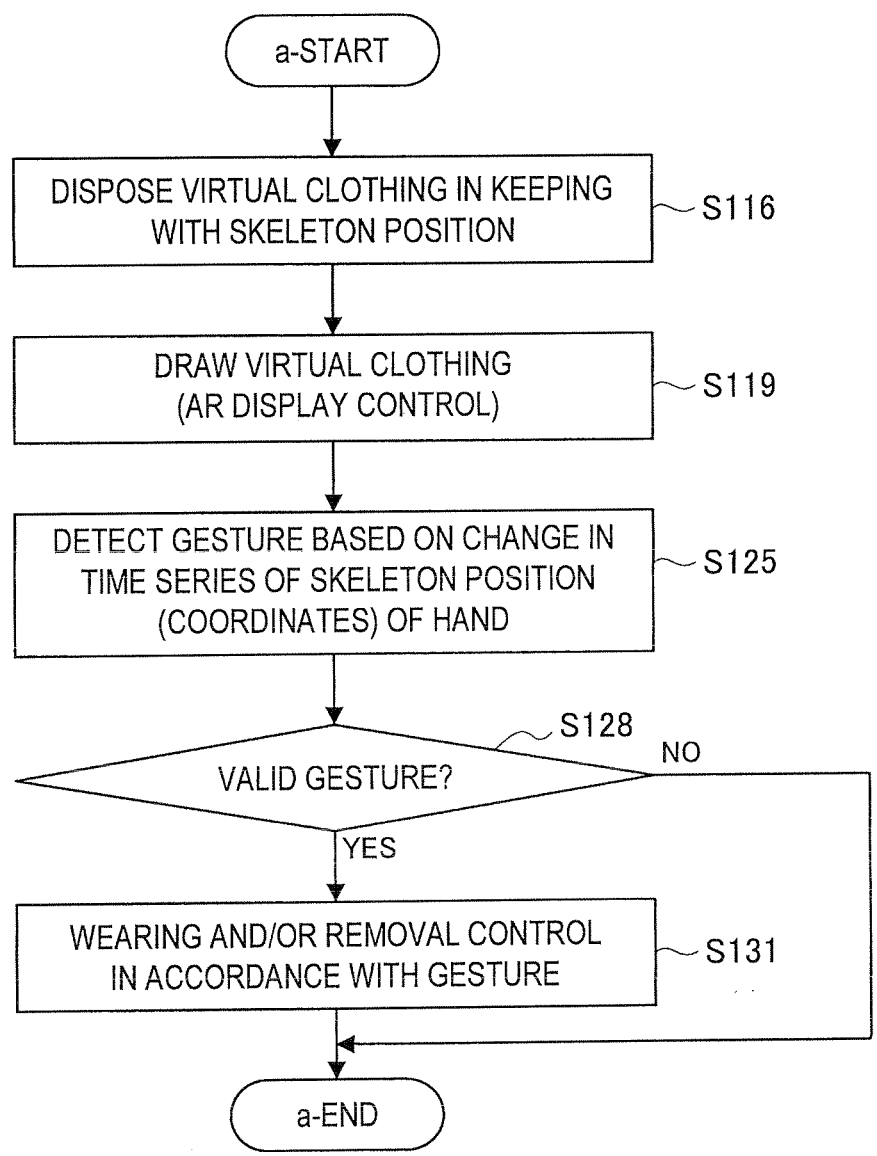
FIG. 8 is a flowchart showing a wearing and/or removal control process in accordance with a gesture according to the embodiment of the present disclosure.

FIG. 8 is a flowchart showing a wearing and/or removal control process in accordance with a gesture carried out by the information processing apparatus 10 according to the present embodiment. The process shown in FIG. 8 shows wearing and/or removal control carried out by display control a in steps S116 and S119 shown in FIG. 7.

First, in step S116 in FIG. 8, in the same way as in the processing in the same step shown in FIG. 7, the virtual clothing C is disposed in a virtual space in keeping with the skeleton position of the subject A. Next, in step S119, in the same way as in the processing in the same step shown in FIG. 7, by displaying the clothing image C' acquired by rendering the virtual clothing C overlaid on the picked-up image A', a basic AR dressing image is displayed on the display apparatus 19.

Next, in step S125, the operation detection unit 103 detects a gesture (operation) based on changes in a time series of the skeleton position (coordinates) of the subject's hands.

After this, in step S128, the operation detection unit 103 determines whether the detected gesture is a valid gesture.

In step S131, the display control unit 105 controls the wearing and removal of clothing in accordance with the gesture determined to be a valid gesture by the operation detection unit 103. Here, the expression "control of wearing and removal of clothing" includes control that displays virtual clothing overlaid on the subject A (i.e., the "wearing" of clothing), control that deletes virtual clothing displayed overlaid on the subject A (i.e., the "removal" of clothing), and control that changes the virtual clothing displayed overlaid on the subject A to other virtual clothing (i.e., the "changing" of clothing).

A variety of valid gestures indicating the wearing and removal of clothing can be imagined. A plurality of specific examples of wearing and/or removal control in accordance with valid gestures according to the present embodiment of the disclosure will now be described in detail.

Example of Wearing Control

FIG. 9 is a diagram useful in explaining wearing control in accordance with a valid wearing gesture according to the present embodiment. Note that the left side of FIG. 9 is composed of transition diagrams for an image where the picked-up image and skeleton information of the subject have been superimposed. The operation detection unit 103 detects an operation based on changes in a time series of the skeleton position as shown on the left in FIG. 9. The right side of FIG. 9 is composed of transition diagrams for an AR dressing image displayed by the display control unit 105 on the display apparatus 19. The display control unit 105 displays the virtual clothing overlaid on the subject based on a skeleton position calculated by the skeleton position calculating unit 101, such as that shown on the left in FIG. 9. The display control unit 105 also controls the wearing and removal of virtual clothing in accordance with movement such as that shown on the left in FIG. 9 detected by the operation detection unit 103.

As shown in the transition diagrams for the skeleton position on the left in FIG. 9, if the coordinates B15 (Left Hand) of the subject have changed in a time series from the coordinates B1 (Head) of the head to the coordinates B3 (Torso) of the torso, the operation detection unit 103 determines a valid gesture indicating the wearing of clothes. In this case, the display control unit 105 displays the virtual clothing C overlaid on the subject A as shown by the transition diagrams for the AR dressing image on the right of FIG. 9. By doing so, it is possible to realize wearing control for an AR dressing room to display an AR image in which the virtual clothing C has been put on.

Note that the virtual clothing C to be displayed overlaid on the subject A may be selected in advance by the subject A. Although there are no particular limitations on the selection method, as one example a selection may be made by carrying out an operation of moving the hand to a position where virtual clothing that the subject wishes to try on is displayed out of a plurality of virtual clothes on display and grasping the desired virtual clothing. Also, if virtual clothing is displayed on both sides of the subject A as shown in FIG. 1, virtual clothing shown on the right may be selected when a wearing gesture has been made by the right hand and virtual clothing shown on the left may be selected when a wearing gesture has been made by the left hand. Note that on detecting a gesture where the subject A moves virtual clothing C, which is displayed on the display apparatus 19 as candidates for being tried on, in the horizontal direction, the display control unit 105 may successively display other virtual clothing as candidates on the display apparatus 19.

Example of Removal Control

Next, one example of removal control according to the present embodiment will be described with reference to FIG. 10. FIG. 10 is a diagram useful in explaining removal control in accordance with a valid removal gesture according to the present embodiment.

As shown in the transition diagrams for the skeleton position on the left in FIG. 10, if the coordinates B15 (Left Hand) of the subject have changed in a time series from the coordinates B3 (Torso) of the torso to the coordinates B1 (Head) of the head, the operation detection unit 103 determines a valid gesture indicating the removal of clothes. In this case, the display control unit 105 stops displaying the virtual clothing C that were overlaid on the subject A as shown by the transition diagrams for the AR dressing image on the right of FIG. 10. By doing so, it is possible to realize removal control for an AR dressing room to display an AR image in which virtual clothing C has been removed.

Example of Changing Control.

Figure 11:
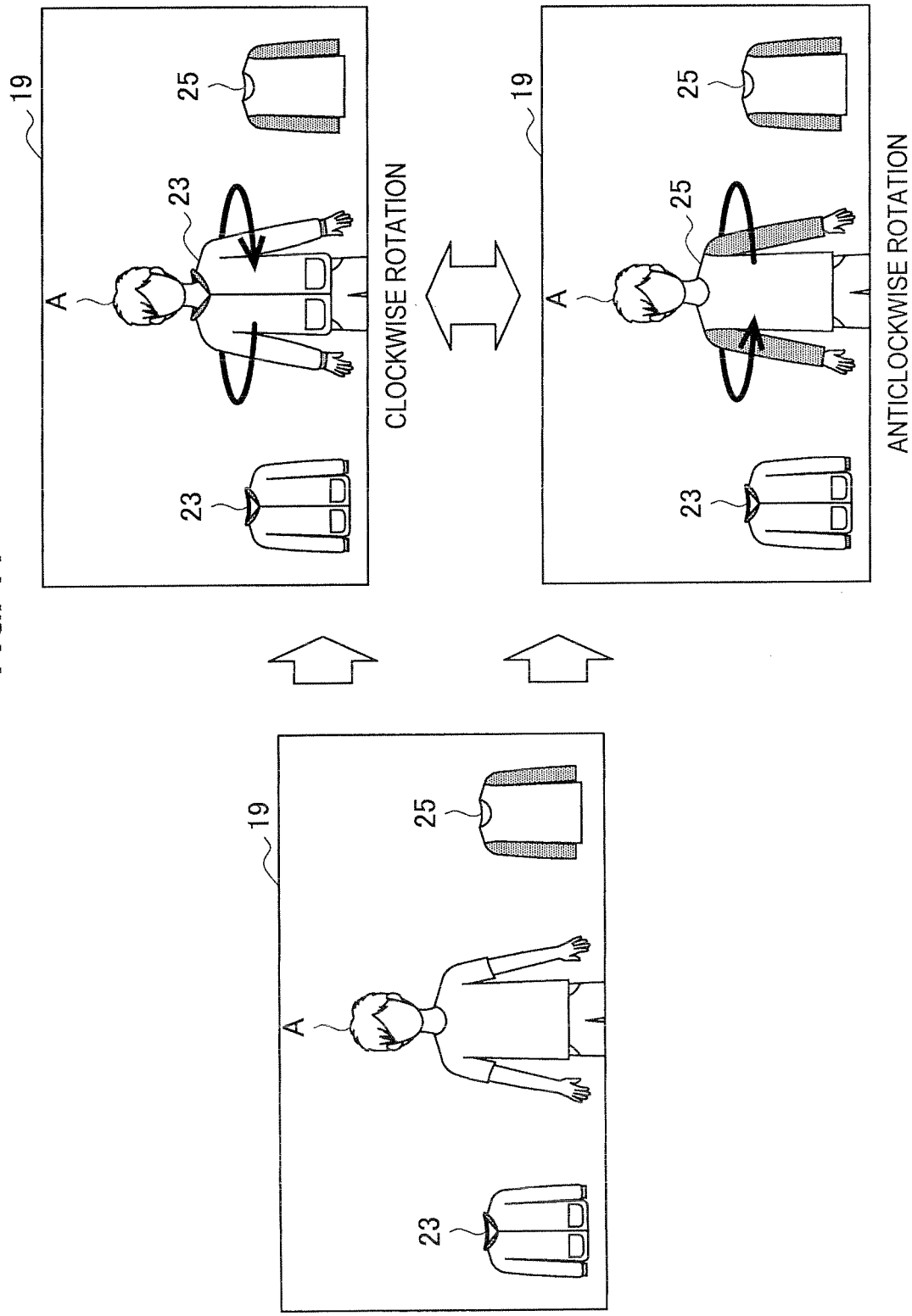
FIG. 11 is a diagram useful in explaining an example of changing control in accordance with a valid gesture according to the embodiment of the present disclosure.

Next, one example of changing control according to the present embodiment will be described with reference to FIG. 11. FIG. 11 is a diagram useful in explaining changing control in accordance with a valid changing gesture according to the present embodiment. The left of FIG. 11 shows a state before virtual dressing and the right of FIG. 11 shows states after virtual dressing in accordance with movement in a rotational direction.

As shown at upper right in FIG. 11, if the operation detection unit 103 has detected clockwise rotation of the subject A in substantially the horizontal direction, the display control unit 105 displays virtual clothing 23 displayed on the left of the screen of the display apparatus 19 overlaid on the subject A.

As shown at lower right in FIG. 11, if the operation detection unit 103 has detected anticlockwise rotation of the subject A in substantially the horizontal direction, the display control unit 105 displays virtual clothing 25 displayed on the right of the screen of the display apparatus 19 overlaid on the subject A.

Also, if the subject A rotates anticlockwise in a state where the virtual clothing 23 is displayed overlaid on the subject A, the display control unit 105 carries out changing control that changes the virtual clothing 23 displayed overlaid on the subject A to the virtual clothing 25 displayed on the right on the screen. In the same way, if the subject A rotates clockwise in a state where the virtual clothing 25 is displayed overlaid on the subject A, the display control unit 105 carries out changing control that changes the virtual clothing 25 displayed overlaid on the subject A to the virtual clothing 23 displayed on the left on the screen.

Changing Footwear

Although wearing and/or removal control of virtual clothing has been described above as one example, the objects to be tried on by the AR dressing system according to an embodiment of the present disclosure are not limited to clothes and as examples may be footwear, eyeglasses or belts. Accordingly, in some cases the valid gestures indicating wearing and/or removal will differ according to the objects to be tried on.

As one example, if footwear is to be changed, on detecting an operation where the subject A shakes his/her foot, the information processing apparatus 10 may carry out control to display virtual footwear overlaid on the feet of the subject A. More specifically, the operation detection unit 103 detects cyclical movement of the feet based on changes in a time series of coordinates B24 or B20 of the feet of the subject A and determines a valid gesture for changing footwear. When a valid gesture for changing footwear has been detected by the operation detection unit 103, the display control unit 105 carries out control that displays virtual footwear selected in advance overlaid on the feet of the subject A.

Display of Intermediate Progress

In all of the wearing and/or removal control described above, the display control unit 105 may carry out display control in keeping with progress of a wearing and/or removal operation. By doing so, it is possible to give visual feedback that an operation by the subject A has been recognized as a valid gesture. Since this also makes it possible to further increase the realism of a virtual dressing room, it is possible to provide a more natural AR dressing system. This will now be described in more detail with reference to FIG. 12.

FIG. 12 is a diagram useful in explaining the displaying of intermediate progress of a removal operation according to the present embodiment of the disclosure. If, as shown at the top in FIG. 12, the coordinates B15 showing the skeleton position of the left hand of the subject A move from the head toward the torso, as shown at the bottom in FIG. 12, the display control unit 105 changes the form of the virtual clothing to be overlaid and displayed in accordance with the position of the coordinates B15 so as to represent the progressive removal of clothing.

The display control unit 105 may also carry out more advanced control that takes the influence of gravity, wind, or the like into consideration when changing the form of the virtual clothing during the progress of a wearing and/or removal operation. For example, by representing how virtual clothing changes in shape and the like during a wearing and/or removal operation while being blown by the wind, it is possible to provide an AR dressing system that is more realistic.

4. CONCLUSION

As described earlier, with the AR dressing system according to the present embodiment of the disclosure, by controlling the wearing and/or removal of clothing in accordance with an operation by the subject, it is possible to provide a natural AR dressing system with greater realism.

Also according to the present embodiment, by modifying virtual clothing in accordance with intermediate progress of a wearing and/or removal operation to display progress when changing the clothing, it is possible to provide a natural AR dressing system that is even more realistic.

It should be understood by those skilled in the art that various modifications, combinations, sub-combinations and alterations may occur depending on design requirements and other factors insofar as they are within the scope of the appended claims or the equivalents thereof.

In addition, although an example where virtual clothing is tried on has been mainly described for the AR dressing system described above, the items to be tried on are not limited to clothes and may be accessories such as eyeglasses, hats, and belts.

Also, although the case where the subject is a person has been described for the AR dressing system described earlier, the subject is not limited to a person and may be an animal such as a dog or a cat. In such case, it is possible to provide an AR dressing system that displays an image of pet clothing, for example, overlaid on a picked-up image in which an animal is captured.

Additionally, the present technology may also be configured as below.

(1)

An information processing apparatus including:

an operation detecting unit detecting an operation of a subject that has been captured; and a display control unit controlling at least one of wearing or removal of at least one of virtual clothing or accessories to be displayed overlaid on the subject in accordance with the operation detected by the operation detecting unit.

(2)

The information processing apparatus according to (1), wherein the display control unit displays at least one of wearing or removal progress of at least one of the clothing or accessories in keeping with progress of the operation detected by the operation detecting unit.

(3)

The information processing apparatus according to (1) or (2), wherein the operation detecting unit detects a wearing operation, and the display control unit displays virtual clothing overlaid on the subject in accordance with the wearing operation.

(4)

The information processing apparatus according to any one of (1) to (3), wherein the operation detecting unit detects a removal operation, and the display control unit stops displaying virtual clothing that was displayed overlaid on the subject in accordance with the removal operation.

(5)

The information processing apparatus according to any one of (1) to (4), wherein the operation detecting unit detects a rotation operation where the subject rotates in substantially a horizontal direction, and the display control unit changes virtual clothing displayed overlaid on the subject in accordance with the detected rotation operation.

(6)

The information processing apparatus according to any one of (1) to (5), wherein the operation detecting unit detects an operation where the subject shakes a foot, and the display control unit carries out control that changes virtual footwear displayed overlaid on feet of the subject in accordance with the detected operation of shaking a foot.

(7)

A display control method including:

detecting an operation of a subject that has been captured; and controlling at least one of wearing or removal of at least one of virtual clothing or accessories to be displayed overlaid on the subject in accordance with the detected operation.

(8)

A program causing a computer to execute:

a process detecting an operation of a subject that has been captured; and a process controlling at least one of wearing or removal of at least one of virtual clothing or accessories to be displayed overlaid on the subject in accordance with the detected operation.

(9)

The program according to (8) or (9), wherein the process of controlling at least one of wearing or removal displays at least one of wearing or removal progress of at least one of the clothing or accessories in keeping with progress of the detected operation.

(10)

The program according to any one of (8) and (9), wherein the process of detecting an operation detects a wearing operation, and the process of controlling displays virtual clothing overlaid on the subject in accordance with the wearing operation.

(11)

The program according to any one of (8) to (10), wherein the process of detecting an operation detects a removal operation, and the process of controlling stops displaying virtual clothing that was displayed overlaid on the subject in accordance with the removal operation.

(12)

The program according to any one of (8) to (11), wherein the process of detecting an operation detects a rotation operation where the subject rotates in substantially a horizontal direction, and the process of controlling changes virtual clothing displayed overlaid on the subject in accordance with the detected rotation operation.

(13)

The program according to any one of (8) to (12), wherein the process of detecting an operation detects an operation where the subject shakes a foot, and the process of controlling carries out control that changes virtual footwear displayed overlaid on feet of the subject in accordance with the detected operation of shaking a foot.

The present disclosure contains subject matter related to that disclosed in Japanese Priority Patent Application JP 2011-245303 filed in the Japan Patent Office on Nov. 9, 2011, the entire content of which is hereby incorporated by reference.

What is claimed is:

1. An information processing apparatus comprising:
   an operation detecting unit detecting an operation of a subject that has been captured after selection of an object by the subject; and
   a display control unit controlling putting on, wearing and removal of the object based on changes in a time series of skeleton positions of the subject and controlling realistic changes in shape of the object as the subject performs at least one of putting on or removal operations of the object including display of intermediate progress in the time series of the skeleton positions of putting on or removal of the object such that the object is displayed partially worn or removed by the subject in a realistic manner of putting on or removal of the object, the object consisting of a single virtual garment or accessory to be displayed overlaid on the subject after completion of the operation detected by the operation detecting unit.

2. The information processing apparatus according to claim 1,
wherein the display control unit displays at least one of wearing or removal progress of the single virtual garment or accessory in keeping with progress of the operation detected by the operation detecting unit.

3. The information processing apparatus according to claim 1,
wherein the operation detecting unit detects a wearing operation, and
the display control unit displays the single virtual garment or accessory overlaid on the subject in accordance with the wearing operation.

4. The information processing apparatus according to claim 1,
wherein the operation detecting unit detects a removal operation, and
the display control unit stops displaying the single virtual garment or accessory that was displayed overlaid on the subject in accordance with the removal operation.

5. The information processing apparatus according to claim 1,
wherein the operation detecting unit detects a rotation operation where the subject rotates in substantially a horizontal direction, and
the display control unit changes the single virtual garment or accessory displayed overlaid on the subject in accordance with the detected rotation operation.

6. The information processing apparatus according to claim 1,
wherein the operation detecting unit detects an operation where the subject shakes a foot, and
the display control unit carries out control that changes virtual footwear displayed overlaid on feet of the subject in accordance with the detected operation of shaking a foot.

7. A display control method comprising:
detecting an operation of a subject that has been captured after selection of an object by the subject;
controlling, putting on, wearing and removal of the object based on changes in a time series of skeleton positions of the subject; and
controlling realistic changes in shape of the object as the subject performs at least one of putting on or removal operations of the object including display of intermediate progress in the time series of the skeleton positions of putting on or removal of the object such that the object is displayed partially worn or removed by the subject in a realistic manner of putting on or removal of the object, the object consisting of a single virtual garment or accessory to be displayed overlaid on the subject after completion of the detected operation.

8. A program embodied on a non-transitory computer readable medium causing a computer to execute:
a process detecting an operation of a subject that has been captured after selection of an object by the subject;
a process controlling putting on, wearing and removal of the object based on changes in a time series of skeleton positions of the subject; and
a process controlling realistic changes in shape of the object as the subject performs at least one of putting on or removal operations of the object including display of intermediate progress in the time series of the skeleton positions of putting on or removal of the object such that the object is displayed partially worn or removed by the subject in a realistic manner of putting on or removal of the object, the object consisting of a single virtual garment or accessory to be displayed overlaid on the subject after completion of the detected operation.

9. The program according to claim 8,
wherein the process of controlling at least one of wearing or removal displays at least one of wearing or removal progress of at least one of the clothing or accessories in keeping with progress of the detected operation.

10. The program according to claim 8,
wherein the process of detecting an operation detects a wearing operation, and
the process of controlling displays the single virtual garment or accessory overlaid on the subject in accordance with the wearing operation.

11. The program according to claim 8,
wherein the process of detecting an operation detects a removal operation, and
the process of controlling stops displaying the single virtual garment or accessory that was displayed overlaid on the subject in accordance with the removal operation.

12. The program according to claim 8,
wherein the process of detecting an operation detects a rotation operation where the subject rotates in substantially a horizontal direction, and
the process of controlling changes the single virtual garment or accessory displayed overlaid on the subject in accordance with the detected rotation operation.

13. The program according to claim 8,
wherein the process of detecting an operation detects an operation where the subject shakes a foot, and
the process of controlling carries out control that changes virtual footwear displayed overlaid on feet of the subject in accordance with the detected operation of shaking a foot.

* * * * *